May 14, 1963
E. L. ADAMS
3,089,192
PLASTIC ACCUMULATOR
Filed May 1, 1961
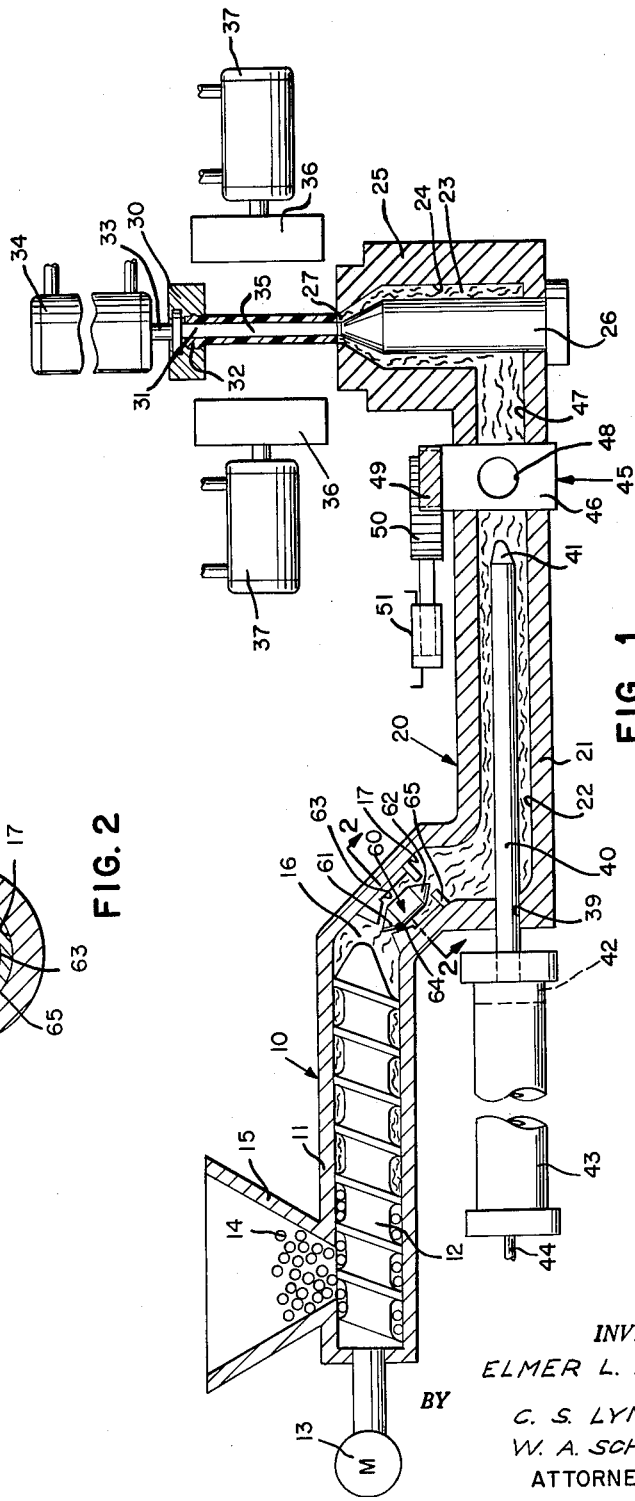
INVENTOR.
ELMER L. ADAMS
BY C. S. LYNCH &
W. A. SCHAICH
ATTORNEYS

United States Patent Office 3,089,192
Patented May 14, 1963

3,089,192
PLASTIC ACCUMULATOR
Elmer L. Adams, Toledo, Ohio, assignor to Owens-Illinois Glass Company, a corporation of Ohio
Filed May 1, 1961, Ser. No. 106,848
3 Claims. (Cl. 18—30)

The present invention relates to a method of and apparatus for making plastic articles and more particularly to a method of and apparatus for expressing plasticized material through an outlet orifice from an accumulation chamber sealed from the source of plasticized material.

In the manufacture of plastic articles by extrusion, injection molding or combined injection-extrusion processes, it has been proposed that plasticized material be supplied to an accumulation chamber from a screw-type plasticizer, the accumulation chamber being cylindrical in shape and provided with an axially displaceable piston sealingly engaging the inner periphery of the chamber to positively force material therefrom.

Generally, the accumulation chamber and the screw-type plasticizer are in full communication with one another, and the expression of plastic material from the accumulation chamber to the outlet orifice under pressures greater than the output pressure of the plasticizer may well cause flow of plastic material under pressure from the accumulation chamber back into the plasticizer.

This flow of material into the plasticizer introduces substantial variations in the charge of material delivered at the outlet orifice or, alternatively, reduces the effective output of the accumulator so that a greater time is required to express a given amount of material at the orifice. Further difficulties have been encountered in the sealing of the accumulator piston within the accumulation chamber, due to the elevated temperature of the plasticized material and the necessity for completely peripherally sealing the cylinder.

The present invention provides a new and novel method of and apparatus for making plastic articles by the utilization of an accumulator communicating with an outlet orifice and positively and automatically isolated from the plasticizer during the expression of material from the orifice. Also, the conventional axially displaceable piston fitting snugly within the accumulation chamber has been eliminated and replaced with a plastic-displacing element which merely projects into the accumulation chamber to displace an equivalent volume of material therefrom without the necessity of sealingly engaging the accumulation chamber walls.

More specifically, the present invention utilizes a screw-type plasticizer communicating with an accumulation chamber which, in turn, communicates with an outlet orifice. A fluid pressure displaceable check valve is interposed between the accumulator chamber and the plasticizer to prevent the back flow of plasticized material from the accumulation chamber to the plasticizer, while accommodating the free flow of plasticized material from the plasticizer to fill the accumulation chamber. Projecting into the accumulation chamber is an elongated, fluid pressure displaceable rod movable into the accumulation chamber to displace an equivalent amount of material through the outlet orifice.

Of course, displacement of the rod into the accumulation chamber elevates the pressure in the chamber and this elevated pressure seals the accumulation chamber from the plasticizer by means of the check valve. Thus, any back flow from the accumulation chamber to the plasticizer is positively prevented.

Following the displacement of plasticized material through the orifice, the orifice is isolated from the accumulation chamber by suitable means, as by a rotary valve, and the rod actuating pressure is relieved. Consequently, material can flow from the plasticizer into the accumulation chamber under the pressure of the plasticizer, this pressure, displacing the rod from the chamber and refilling the chamber with plasticized material for the next operating cycle of the machine.

It is, therefore, an important object of the present invention to provide a method of and apparatus for making a plastic article by the expresison of plasticized material through an outlet orifice from an accumulation chamber.

Another object of this invention is the provision of an improved, cyclically operated apparatus for making plastic articles including a plasticizer and an accumulation chamber adapted to receive plasticized material from the plasticizer and a check valve interposed between the plasticizer and the accumulation chamber to accommodate the free flow of plasticized material to the accumulation chamber but to prevent the reverse flow of plasticized material from the chamber to the plasticizer.

It is a further object of the present invention to provide a method for the intermittent issuance of plasticized material from an orifice wherein plasticized material is supplied to an accumulation chamber from a suitable source and at a predetermined pressure and wherein plasticized material is supplied from the accumulator space to the orifice at a higher pressure, the higher pressure isolating the accumulation chamber from the source of plasticized material during the expression of plasticized material through the orifice.

Still another important object of the present invention is the provision of an apparatus for making plastic articles expressed through an outlet orifice from an accumulation chamber into which a material-displacing member is insertable into the accumulation chamber to displace an equivalent volume of plasticized material through the orifice and which is retractable from the chamber to accommodate refilling of the chamber from a source of plasticized material.

Other objects of this invention will appear in the following description and appended claims, reference being had to the accompanying drawings forming a part of this specification wherein like reference characters designate corresponding parts in the several views.

On the drawings:

FIGURE 1 is a schematic representation of the method of the present invention as embodied in the apparatus of this invention; and FIGURE 2 is an enlarged sectional view taken along the plane 2—2 of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to a screw-type plasticizer including a cylindrical plasticizer barrel 11 within which is rotatably disposed a helically threaded plasticizer screw 12 driven by suitable means, such as motor 13. The screw 12 is effective to advance solid plasticized material 14 fed into the barrel 11 through an overhead supply hopper to a plasticizer outlet 16. The barrel 11, as is conventional in such plasticizers, is heated by external electrical resistance heaters, and the conveyance of the material by the screw 12 through the barrel 11 causes the material to be mechanically worked and heated to a plasticized, non-solid state by the time the material attains the plasticizer outlet 16.

Fully communicating with the plasticizer outlet 16 through a joining passage 17 is an accumulation chamber, indicated generally at 20. The chamber 20 includes a cylindrical peripheral wall 21 enclosing an inner cylindrical accumulation space 22 in full communication with plasticized material orifice supply chamber 23 defined between the cylindrical inner walls 24 of a mandrel block 25 and a centrally located, vertically extending mandrel 26, the mandrel cooperating with the passage 24 at the upper end thereof to define an annular outlet orifice 27 from which plasticized material is expressed.

Although the outlet orifice 27 may be properly identified as an "extrusion orifice," it may be adapted to combined injection molding and extrusion operations by utilization of an injection mold 30 peripherally enclosing a centrally located plug 31 to define an injection mold space 32. Preferably, the mold 30 is carried on the actuating rod 33 of a hydraulically actuated cylinder 34 effective to move the mold 30 between its illustrated raised position and a lowered position at which the mold space 32 communicates freely and directly with the orifice 27.

As illustrated, the extruded tube 35 is adapted to be enclosed within cooperable blow mold segments 36 each carried by hydraulically actuated cylinders 37 for closure onto the tube 35, the tube subsequently being blown internally of the mold segments 36 by the introduction of air through the actuating rod 33 and the inner mold element 31 in a manner well known in the art.

The accumulation chamber 22 is apertured at one wall, as at 39, to receive therethrough a plasticized material displacing element 40 in the form of an elongated, generally cylindrical rod having a frusto-conical leading end or nose 41. This rod 40 projects through the aperture 39 and is sealed therein by suitable means (not shown) to project therebeyond for attachment to the piston 42 of a fluid pressure actuated cylinder 43 of the single-acting type and receiving fluid under pressure through a conduit 44. The rod 40 is illustrated in its fully extended position to project axially into the cylindrical accumulation chamber 22.

Of course, the projection of the rod 40 into the chamber will reduce the effective volume of the chamber in direct proportion to the length of rod projecting thereinto.

Interposed between the accumulation chamber 22 and the orifice 27 is a rotatable shut-off valve 45 consisting of a cylindrical valve body 46 projecting across the passage 47 joining the accumulation chamber to the orifice 27 and provided with a central aperture 48 of substantially the same size as the passage 47. The valve is illustrated in its "off" position at which the valve port 48 is turned at right angles to the passage 47 to shut off flow from the accumulation chamber 22 to the orifice 27. The cylindrical valve body 46 is angularly displaced to the extent of ninety degrees by means of a pinion 49 rotatable with the valve body, a rack 50 in mesh with the pinion, and a fluid pressure actuating cylinder 51.

Interposed between the plasticizer 10 and the accumulation chamber 20 is a check valve indicated generally at 60. This check valve 60 comprises a cylindrical body provided with conical ends 61 and 62, and the valve body 60 is trapped in a surrounding housing fixed within the passage 17. The housing has a medial cylindrical passage 63, an internal conical valve seat 64 at its end adjacent the plasticizer 10 and a plurality of radially projecting stops 65 at its end adjacent the accumulation chamber 20.

The valve body 60 is freely floatable within the housing in response to pressure differences thereacross. Indicating the outlet pressure in the plasticizer as P1, the pressure within the accumulation chamber, when in communication with the plasticizer, as P2, and the pressure generated within the accumulation chamber by the rod 40 as P3, the operation of the device can be readily appreciated.

Assuming that a combined injection and extrusion molding operation has just been completed, the apparatus is in its condition illustrated in FIGURE 1 of the drawings wherein the rod 40 is fully expressed into the accumulation chamber 20, and the rotary valve 45 is in its closed position. At this time, the cylinder 43 is vented to a lower back pressure and the pressure P1 in the plasticizer 10 becomes greater than the pressure P2 within the accumulation chamber 20. Because of the resultant pressure difference across the valve body 60, the valve body is displaced downwardly and to the right, as illustrated in FIGURE 1 of the drawings, into contact with the radial stops 65. It will be noted that these stops 65 are peripherally spaced (FIGURE 2) to accommodate the flow of plasticized material therebetween and material flow from the plasticizer 16 into the accumulator chamber 20 will readily occur.

Such flow is obtained by the higher pressure P1 in the plasticizer forcing itself into the accumulation chamber, until eventually pressures P1 and P2 become equal. Initially the higher value of P1 is exerted upon the end nose 41 of the rod 40 to cause the rod to be retracted against the lower cylinder back pressure. Flow from the extruder into the accumulation chamber will continue so long as the pressure P1 exceeds the pressure P2 and so long as the rod 40 recedes from the chamber 20, i.e. until the piston 42 bottoms against an internal stop in the cylinder 43 or until the resistance of the rod to further retraction exceeds the forces exerted by pressure P1.

It will be recalled that during this time, the tube 35 is being inflated internally of the blow mold segments 36. Following completion of the blow molding operation and removal of the blown article from the opened blow mold segments 36, the injection mold 30 is returned to its lowermost position directly communicating with the orifice 27 by operation of the cylinder 34.

At this time, the next injection molding operation is commenced by introducing fluid under pressure through the conduit 44 into the interior of the cylinder 43. At the same time, the valve 45 is rotated 90° to its open position by actuation of the cylinder 51, and the rod 40 is projected into the accumulation chamber 20 to an extent necessary to displace a sufficient volume of plasticized material to fill the injection mold space 32 from the orifice 27. Due to the complete filling of the mold space 32, the greater pressure P3 is generated in the accumulation chamber 20 to form the effective molding pressure under which the material injected into the mold space 32 is at least partially solidified.

The expression of the rod 40 into the accumulation chamber 20 will increase the pressure P2 to the pressure P3 i.e. to a value greater than plasticizer pressure P1 and the check valve 60 will be displaced toward the plasticizer to a closed position against the valve seat 64, thus isolating the plasticizer from the accumulation chamber and preventing any back flow of plasticized material at the higher pressure from the accumulation chamber into the plasticizer.

Following completion of the injection molding portion of the cycle, the injection mold 30 is elevated from its lowered position to its raised position illustrated in FIGURE 1 of the drawings, thus opening the orifice 27, for the expression therethrough of a tubular extension integral with material filling the injection mold space 32, and momentarily reducing the pressure within the accumulation chamber. This reduction in pressure at the orifice again renders the pressure P3 within the accumulation chamber 20 effective to express material from the chamber 20 through the orifice under the pressure determined by the volumetric displacement of the rod 40, while maintaining the pressure in the accumulation chamber 20 at a value higher than the pressure P1 in the plasticizer.

At the completion of the extrusion operation, the rotary valve 45 is moved to its illustrated closed position, the pressure of fluid introduced into the rod cylinder 43 through the conduit 44 is materially reduced, the pressure P2 in the accumulation chamber to shift the check valve 60 to its open position accommodating the flow from the plasticizer to the accumulation chamber to initiate the next successive cycle as above described.

Thus, it will be seen that the check valve is actuated by differential pressures acting thereacross, the plastic forming pressures generated by the rod 40 during injection and/or extrusion operations are effective to issue plasticized material from the accumulation chamber through the orifice 27, such pressure actuating the valve 60 to automatically and positively seal the accumulation chamber from the plasticizer whenever the accumulation chamber pressure exceeds the plasticizer output pressure. Thus, the delivery of successive issues of plasticized material of constant volume and weight through the orifice 27 is insured because of the isolation of the accumulation chamber from the plasticizer. Additionally, at any time when it is desired to accumulate additional plasticized material for subsequent forming operations, the valve 60 is automatically and positively shifted by the pressure differential thereacross to accommodate the filling of the accumulation chamber from the plasticizer. Utilization of the single acting cylinder-actuated rod 40 for generating forming operating pressures within the accumulation chamber effectively correlates extension and retraction of the rod with forming and refilling operations, prevents cavitation within the accumulation chamber, and obviates the necessity of sealing a relatively large diameter piston accurately against a correspondingly sized accumulation chamber wall.

So far as operation of the plasticizer screw 12 is concerned, the motor 13 may drive the screw continuously if desired where fairly short periods of isolation of the plasticizer from the accumulator 22 are involved, or the motor 13 may drive the plasticizer screw 12 intermittently, as desired.

All in all, it will be appreciated by those skilled in the art that the present invention provides an extremely simple and fool-proof method of and apparatus for making plastic articles by injection molding, extrusion, or combined injection-extrusion processes.

Having thus described my invention, I claim:

1. In a method of making a plastic article by the steps of continuously plasticizing material from a source at a pressure P1, storing the material in an accumulation chamber at a pressure P2, and dispensing material from said chamber and through an orifice at a pressure P3, the improvements of supplying plasticized material to the accumulation chamber from said source whenever P1 is greater than P2, developing pressure P3 in the chamber by the insertion of a material-displacing rod into the chamber, simultaneously isolating the accumulation chamber from the plasticizer and dispensing material from the chamber through the orifice whenever pressure P3 is developed in said chamber, subsequently isolating the chamber from the orifice, displacing said rod from said chamber by supplying material thereto from said source, and developing pressure P2 in said chamber by the resistance of said rod to displacement from said chamber.

2. In an apparatus for forming a plastic article from plasticized material, a plasticizer, means defining a dispensing orifice, means defining an accumulation chamber interposed between the plasticizer and the orifice, a material-displacing rod of a diameter substantially less than the diameter of said chamber, a single acting fluid pressure actuated cylinder for extending said rod into said chamber and for resisting retraction of said rod from said chamber, a check valve interposed between the accumulation chamber and the plasticizer and responsive to pressure differences therebetween to selectively control communication between the chamber and the plasticizer, and an off-on valve interposed between the accumulation chamber and the orifice to control the dispensing of plasticizer material through said orifice.

3. In a method of making a plastic article wherein plasticized material is supplied to an outlet orifice for subsequent forming, the steps of continuously plasticizing material, supplying plasticized material to an accumulation chamber from a plasticizer, inserting a material-displacing element into the chamber to develop in the chamber a pressure greater than plasticizer output pressure, and utilizing the developed pressure to simultaneously express material from said chamber through the orifice and seal the accumulation chamber from the plasticizer only while material is being dispensed from said chamber.

References Cited in the file of this patent

UNITED STATES PATENTS

| | | |
|---|---|---|
| 2,831,214 | Eyles et al. | Apr. 22, 1958 |
| 2,871,516 | Sherman et al. | Feb. 3, 1959 |
| 2,881,477 | Truilizi | Apr. 14, 1959 |
| 2,944,288 | Sherman | July 12, 1960 |

FOREIGN PATENTS

| | | |
|---|---|---|
| 1,224,930 | France | June 28, 1960 |